D. CURTIS.
Horse-Collars.

No. 126,682.

Patented May 14, 1872.

Witnesses
N. H. Sherburne
N. C. Gridley

Inventor
Dexter Curtis
By Farwell & Co
his attys

UNITED STATES PATENT OFFICE.

DEXTER CURTIS, OF SUN PRAIRIE, WISCONSIN.

IMPROVEMENT IN LININGS FOR HORSE-COLLARS.

Specification forming part of Letters Patent No. 126,682, dated May 14, 1872.

SPECIFICATION.

*To all whom it may concern:*

Be it known that I, DEXTER CURTIS, of Sun Prairie, in the county of Dane and State of Wisconsin, have invented a new, useful, and Improved Horse-Collar and Lining for Horse-Collars, Saddles, Harness-Pads, Ox-Yokes, and Ox-Yoke Collar-Pads; and I do hereby declare the following to be a full, clear, and exact description thereof, which will enable others skilled in the art to make and use the same, reference being had to the accompanying drawing forming part of this specification, in which—

Figure 1:
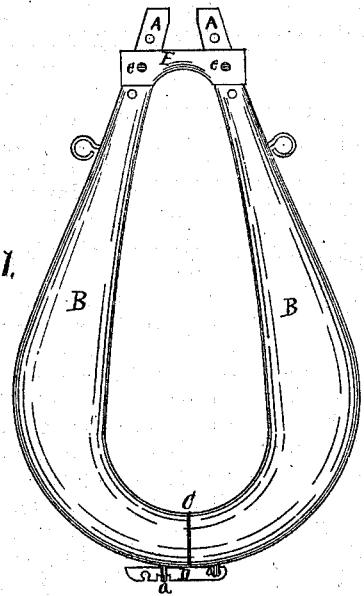
Figure 2:
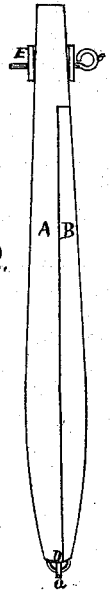

Figure 1 is a front view of a horse-collar, with my improved lining attached thereto, and Fig. 2 is a side view of the same.

Similar letters indicate like parts in both figures of the drawing.

My invention consists in lining horse-collars, saddles, harness-pads, ox-yokes, and ox-yoke collar-pads with commercial sheet or plate zinc, formed into the appropriate shape, and of the dimensions to fit such collars, saddles, pads, and ox-yokes, and attached thereto by sewing, or in any other known manner; also, in constructing a horse-collar of wood and in two parts, and so as to adjust the length and width thereof as desired.

In the drawing, A represents a horse-collar, which may be made of wood, or may be made in the usual manner; and B, the lining, of commercial sheet or plate zinc, and bent in shape corresponding to the shape or form of the bearing-surface of the collar, and is securely sewed, or otherwise attached thereto. The said collar, when made of wood, is made in two parts, as shown at C, each part being provided, at its lower end, with a staple, *a*, upon one of which is secured a metal latch, D, which is provided with a series of notches, *d d*, formed at graduated distances across its lower edge, and is so arranged as to admit of a rocking movement, thereby allowing the same to be turned to the proper position to be passed through the opposite staple *a'*, which latch is then turned to its normal position, allowing the staple to enter one of the notches, by which means the two parts of the collar are firmly connected. E is a clasp or yoke, which is provided at each end with a slot or mortise, into which the upper portion of the collar is secured by pins *e e*, passing through the same. The lower surface of said clasp is formed in proper shape to fit the upper portion of the neck, and is also faced with sheet or plate zinc. The upper portion of the two parts of the collar is provided with a series of apertures, arranged at graduated distances, one from the other, through which the pins *e e* pass as the clasp or yoke is raised or lowered; the object of which, together with the notches formed in the latch, is to admit of adjusting the collar to the size of the horse's neck. In using my improved lining, made of commercial sheet or plate zinc, I attach, by any known means, the said lining to horse-collars, saddles, harness-pads, ox-yokes, and ox-yoke collar-pads, as ordinarily constructed and in common use, so that the same shall come in direct contact with the flesh of the horse or ox. The zinc-lining has both a mechanical and chemical effect, and has a tendency both to prevent and to cure chafing and gall. The mechanical effect consists in the exclusion of the air and organic germs by the impervious metallic surface. The chemical, and most important, effect is caused by the action of the zinc-plate upon the acid and saline constituents of the moist animal muscle and fluids, resulting in the production of oxide, carbonate, lactate, and other compounds of zinc. This chemical action is accomplished and very much increased by the local galvanic action occasioned by the contact of the impure commercial zinc with the moist saline and acidulous flesh. The zinc salts, by their astringency, promote the healing of the injured parts; and, by their antiseptic properties, tend to destroy the injurious organic germs previously adherent to, or which might at any time attach themselves to the exposed wounds. The chemical action, and, therefore, the antiseptic effect, will be greatest at the edges of the wound, where its aid would be most needed, because at this point there would be the least mechanical protection, and the greatest exposure to the air.

Having thus described the nature and object of my invention, what I claim as new, and desire to secure by Letters Patent, is—

A horse-collar, saddle, harness-pad, ox-yoke, and an ox-yoke collar-pad, lined with commercial sheet or plate zinc, substantially as and for the purpose specified.

DEXTER CURTIS.

Witnesses:
M. D. DAVISON,
ED. F. RILEY.